United States Patent [19]

Sagawa et al.

[11] 3,904,638

[45] Sept. 9, 1975

[54] PURIFICATION OF CRUDE 2-MERCAPTOBENZOTHIAZOLE

[75] Inventors: Seiji Sagawa, Hirakata; Haruo Kunihiro, Toyonaka; Osamu Kimura, Toyonaka; Masatoshi Inoue, Toyonaka, all of Japan

[73] Assignee: Sumitomo Chemical Company, Limited, Japan

[22] Filed: Nov. 29, 1972

[21] Appl. No.: 310,582

[30] Foreign Application Priority Data
Nov. 29, 1971 Japan............................... 46-96628

[52] U.S. Cl................................. 260/306; 260/306
[51] Int. Cl............................................ C07d 91/48
[58] Field of Search...................................... 260/306

[56] References Cited
UNITED STATES PATENTS
3,681,371  8/1972  Sagawa et al...................... 260/306
3,770,759  11/1973  Scherhag et al.................... 260/306

Primary Examiner—Richard J. Gallagher
Attorney, Agent, or Firm—Craig & Antonelli

[57] ABSTRACT

A process for purification of crude 2-mercaptobenzothiazole obtained by the reaction of aniline, carbon disulfide and sulfur at a high temperature under an elevated pressure according to a conventional procedure which comprises dispersing the crude 2-mercaptobenzothiazole into an aromatic hydrocarbon, e.g. benzene, filtering the resultant dispersion, dissolving the collected particles into an aqueous caustic alkali, e.g. sodium hydroxide, and filtering the resulting alkaline solution to give an aqueous solution of the alkali salt of 2-mercaptobenzothiazole of high purity.

18 Claims, No Drawings

PURIFICATION OF CRUDE 2-MERCAPTOBENZOTHIAZOLE

The present invention relates to the purification of crude 2-mercaptobenzothiazole. More particularly, it relates to an improved process for purification of crude 2-mercaptobezothiazole obtained by the reaction of aniline, carbon disulfide and sulfur.

2-Mercaptobenzothiazole, which is useful as a starting material for production of thiazole derivatives per se valuable as vulcanization accelerators, is most ordinarily prepared by reacting aniline, sulfur and carbon disulfide in an appropriate molar ratio at a high temperature under an elevated pressure. The crude 2-mercaptobenzothiazole product thus prepared is contaminated with a variety of by-products such as anilinobenzothiazole, benzothiazole, phenyl isothiocyanate, diphenylthiourea, 2-aminothiophenol and 3-(2-benzothiazolyl)-2-benzothiazolinethione as well as unreacted aniline and sulfur. It is also contaminated with a resinous tar substance having a composition and chemical structure that are unknown.

For purification of such crude 2-mercaptobenzothiazole, there have been proposed a number of purification procedures, among which one of the most advantageous methods is described in Belgian Pat. No. 755,609. In this method the crude 2-mercaptobenzothiazole is vaporized so as to separate involatile impurities, the vaporized components are condensed, the condensed material is dissolved in an aqueous caustic alkali to remove insoluble materials and the resultant solution is shaken with an aromatic hydrocarbon in liquid phase at room temperature. The thus obtained aqueous solution contains the alkali salt of 2-mercaptobenzothiazole of higher purity.

As the result of further study, there has now been found a more advantageous method which can afford 2-mercaptobenzothiazole of high purity easily and economically.

The purification process of the present invention comprises dispersing in an aromatic hydrocarbon the crude 2-mercaptobenzothiazole obtained by the reaction of aniline, sulfur and carbon disulfide, filtering the resultant dispersion, dissolving the collected particles into an aqueous caustic alkali and filtering the resultant solution to give an aqueous solution of the alkali salt of 2-mercaptobenzothiazole of high purity. The thus obtained solution may be as such used for production of thiazole derivatives valuable as vulcanization accelerators. Alternatively, crystals of 2-mercaptobenzothiazole of high purity can be isolated by the addition of an inorganic acid to the solution.

Compared with the method described in Belgian Pat. No. 755,609, the process of the invention is advantageous in that the vaporization of 2-mercaptobenzothiazole is not required so that the apparatus required is simplified and the heat and vacuum sources are economized.

On carrying out the process of this invention, the crude 2-mercaptobenzothiazole obtained by reacting aniline, sulfur and carbon disulfide at a high temperature such as 200°C. or more under an elevated pressure such as 40 kg/cm$^2$ or higher, in a conventional manner is dispersed in an aromatic hydrocarbon to give a dispersion or slurry including fine particles of 2-mercaptobenzothiazole.

The dispersing step may be effected by discharging the crude 2-mercaptobenzothiazole in a melt state into the aromatic hydrocarbon while stirring. Alternatively, dispersion may be carried out by pulverizing solidified crude 2-mercaptobenzothiazole and adding the resultant fine particles to the aromatic hydrocarbon, preferably followed by refluxing (e.g. 50° to 200°C.) for about 30 to 60 minutes in an appropriate reflux apparatus under autogenous pressure at temperature sufficient to vaporize the solvent.

The resulting dispersion or slurry is filtered, preferably after cooling below 20°C., and the collected particles are washed with an aromatic hydrocarbon of the same kind as used above to from the dispersion.

As suitable hydrocarbons, there may be used those which are liquids at room temperature and having a boiling point between about 50° and 200°C. under atmospheric pressure such as octylbenzene, cresol, benzene, toluene or xylene. Also, certain substituted aromatic hydrocarbons such as chlorobenzene and nitrobenzene may be used. Those boiling at 80° to 150°C. such as benzene, toluene and xylene are preferred. The amount of the aromatic hydrocarbon to be used may be usually from about 1 to 10 parts by volume, favorably from about 3 to 7 parts by volume per 1 part volume of the crude 2-mercaptobenzothiazole.

The thus obtained particles are discharged in an aqueous caustic alkali of a concentration of 5 to 25% (weight by weight), favorably of 10 to 20% (weight by weight) so that 2-mercaptobenzothiazole is dissolved therein while impurities such as anilinobenzothiazole, diphenylthiourea and 3-(2-benzothiazolyl)-2-benzothiazolinethione remain as insoluble materials. Filtration of the resultant solution at about 5° to 50°C. for removal of the insoluble impurities affords a pale yellowish brown, transparent liquid.

Examples of the caustic alkali utilizable above are sodium hydroxide, potassium hydroxide, etc. (Also other caustic hydroxides such as calcium hydroxide may be used, but are less preferred.)

The alkaline liquid is then allowed to stand whereby the aromatic hydrocarbon as used above is allowed to separate in a layer and float on the surface. Elimination of the layer of aromatic hydrocarbon by decantation gives an aqueous solution of the alkali salt of 2-mercaptobenzothiazole in an extremely high purity.

The hereinabove obtained aqueous solution may be subjected to oxidation to produce a disulfide or to reaction with an amine (e.g. t-butylamine, cyclohexylamine, morpholine) to yield a sulfenamide. When desired, an inorganic acid is added to the aqueous alkaline solution and the resulting precipitated crystals are collected by filtration to recover 2-mercaptobenzothiazole of high purity. As the inorganic acid, there may be used hydrochloric acid, nitric acid, sulfuric acid or the like.

In the process of this invention, the treatment of the crude 2-mercaptobenzothiazole with an aromatic hydrocarbon is effective in eliminating aniline, benzothiazole, phenyl isothiocyanate, 2-aminothiophenol, sulfur and other impurities soluble in the aromatic hydrocarbon. Particularly notable is that a resinous tar substance of which the composition and the chemical structure are unknown can be completely eliminated by such treatment. Further, the filtration of the solution of 2-mercaptobenzothiazole in an aqueous caustic alkali is effective in removing anilinobenzothiazole, diphenylthiourea, 3-(2-benzothiazolyl)-2-benzothiazolinethione and other impurities insoluble in the aqueous caustic alkali.

In Belgian Pat. No. 754814, there is described a method which comprises dissolving crude 2-mercaptobenzothiazole in an aliphatic, alicyclic or aromatic hydrocarbon having a boiling point of from 60° to 160°C. at a temperature of from 10° to 50°C., extracting the resultant solution with a dilute aqueous caustic alkali, separating the water layer and adding an acid thereto whereby 2-mercaptobenzothiazole is isolated. This method is, however, disadvantageous in that an extremely large amount of the organic solvent is required and also in that the concentration of 2-mercaptobenzothiazole in the aqueous caustic alkali solution must be low. The solubility of 2-mercaptobenzothiazole in a non-polar organic solvent such as an aromatic hydrocarbon is relatively small as shown in Table 1 and less than 1% at a temperature range of from 10° to 50°C. desirable for this method. Thus, the industrial adoption of the method is almost impossible. Further, the extraction of 2-mercaptobenzothiazole from the solution is an aromatic hydrocarbon with a dilute aqueous caustic alkali can be accomplished only with the simultaneous extraction of 2-aminothiophenol. Thus, the extract contains not only 2-mercaptobenzothiazole but also 2-aminothiophenol as an impurity, which can be only separated with difficulty. Furthermore, the elevation of the concentration of the caustic alkali for preparing a 10% or higher concentration of 2-mercaptobenzothiazole results in the increase of the solubilities of sulfur, aniline, benzothiazole and the like therein. For instance, the solubility of sulfur in a 30 to 40% aqueous caustic alkali solution of 2-mercaptobenzothiazole is considerably high as shown in Table 2. Thus, the purity of 2-mercaptobenzothiazole is considerably lowered.

Table 1

Solubility of 2-mercaptobenzothiazole in Aromatic Hydrocarbon (g/g)

| Temperature (°C.) | Solvent | |
|---|---|---|
| | Toluene | Xylene |
| 20 | 0.004 | 0.007 |
| 40 | 0.005 | 0.009 |
| 60 | 0.012 | 0.021 |
| 80 | 0.023 | 0.035 |

Table 2

Solubility of Sulfur in Aqueous Caustic Alkali Solution of 2-mercaptobenzothiazole (g/100 g of the Solution)

| Concentration of 2-mercaptobenzothiazole (% by weight) | Temperature (°C.) | | |
|---|---|---|---|
| | 20 | 40 | 60 |
| 30 | 0.03 | 0.27 | 0.76 |
| 40 | 0.05 | 0.33 | 1.08 |

In the process of the invention, the low solubility of 2-mercaptobenzothiazole in an aromatic hydrocarbon is utilized. Thus, impurities such as sulfur, aniline and 2-aminothiophenol are dissolved in the aromatic hydrocarbon and filtered so as to be separated from the insoluble 2-mercaptobenzothiazole. Because of this reason, the concentration of the caustic alkali used in the subsequent step for dissolving the resultant 2-mercaptobenzothiazole therein can be advantageously made high without any particular limitation.

A practical and presently preferred embodiment of the present invention is illustratively shown in the following Example wherein "%" is percent by weight.

EXAMPLE 1

Crude 2-mercaptobenzothiazole (500 g) consisting of 0.08% of carbon disulfide, 0.09% of aniline, 2.54 % of benzothiazole, 0.80% of sulfur, 1.15% of anilinobenzothiazole, 1.31% of 3-(2-benzothiazolyl)-2-benzothiazolinethione, 84.53% of 2-mercaptobenzothiazole, 2.30% of unknown component and 1.20% of resinous tar substance is charged in a vessel and heated at 200°C. to make a melt. The melt is supplied into a 2 liter-volume flask charged with toluene (500 ml) while stirring at such a supplying rate that a mild reflux of the toluene is maintained. The resultant yellowish brown slurry is, after cooled below 20°C. with stirring, filtered by the aid of a funnel and paper, and the obtained cake is washed well with toluene (800 ml) to eliminate the mother liquor attached on the surface. The filtrate and the washing are combined together and distilled to recover toluene as well as aniline, benzothiazole and sulfur, which may be recycled to the process for preparation of 2-mercaptobenzothiazole. The cake wetted with toluene (605 g; toluene content, 140 g) is added to a 16% solution of sodium hydroxide (108.2 g) in water (570.8 g), and the mixture is stirred at room temperature for 1 hour and then filtered. The collected substance is a mixture of 43.2% of anilinobenzothiazole and 56.8% of 3-(2-benzothiazolyl)-2-benzothiazolinethione, and it may be recycled to the process for preparation of 2-mercaptobenzothiazole. The filtrate is allowed to stand for a while, and the upper toluene layer (138 g) is separated. The lower water layer is a 40% transparent, light yellowish brown aqueous solution of sodium salt of 2-mercaptobenzothiazole (1133.6 g). The solution is admixed with water (3000 g), and 28% sulfuric acid (150 g) is added thereto while stirring. The precipitated light yellowish white powder is collected by filtration and dried to give 2-mercaptobenzothiazole (452.6 g). M.P. 182.0° – 182.5°C. Purity, 99.99%. The yield of purification is almost quantitative.

While the novel principles of the invention have been described, it will be understood that various omissions, modifications and changes in these principles may be made by one skilled in the art without departing from the spirit and scope of the invention.

What is claimed is:

1. A process for purification of the crude 2-mercaptobenzothiazole obtained by the reaction of aniline, carbon disulfide and sulfur at a high temperature under an elevated pressure which comprises dispersing the crude 2-mercaptobenzothiazole in a sufficient amount of an aromatic hydrocarbon, nitrobenzene or chlorobenzene to dissolve some of the components in the crude 2-mercaptobenzothiazole without dissolving the 2-mercaptobenzothiazole, filtering the resultant dispersion, discharging the collected particles into sufficient aqueous alkaline solution to substantially separate 2-mercaptobenzothiazole from the remainder of the particles, and filtering the resulting solution to give an aqueous solution of the alkaline salt of 2-mercaptobenzothiazole.

2. The process of claim 1, wherein the aromatic hydrocarbon is a liquid which has a boiling point from 50° to 200°C. under atmospheric pressure.

3. The process of claim 2, wherein the amount of the aromatic hydrocarbon, nitrobenzene or chlorobenzene used is 1 to 10 parts by volume per 1 part by volume of the crude 2-mercaptobenzothiazole.

4. The process of claim 1, further comprising adding an inorganic acid to the obtained aqueous solution of the alkaline salt of 2-mercaptobenzothiazole to precipitate particles of 2-mercaptobenzothiazole.

5. The process of claim 1, wherein the aromatic hydrocarbon comprises benzene, toluene or xylene.

6. The process of claim 1, wherein the alkaline solution is a solution of a caustic alkali.

7. The process of claim 6, wherein the concentration of the caustic alkali is from about 5 to 25% by weight.

8. A process for purification of the crude 2-mercaptobenzothiazole obtained by the reaction of aniline, carbon disulfide and sulfur at a high temperature under an elevated pressure comprising dispersing the crude 2-mercaptobenzothiazole in a liquid selected from the group consisting of nitrobenzene, chlorobenzene and an aromatic hydrocarbon having a boiling point between about 50° to 200°C under atmospheric pressure, the amount of said liquid being sufficient so that at least some of the components in said crude 2-mercaptobenzothiazole dissolve in said liquid but insufficient to dissolve 2-mercaptobenzothiazole therein, filtering the resultant dispersion, discharging the collected particles into sufficient aqueous alkaline solution to substantially separate 2-mercaptobenzothiazole from the remainder of said particles, filtering the resulting solution to give an aqueous solution of the alkaline salt of 2-mercaptobenzothiazole of high purity, and precipitating 2-mercaptobenzothiazole from the aqueous solution of the alkaline salt of 2-mercaptobenzothiazole by acidification.

9. The process of claim 8, wherein the amount of liquid used is 1 to 10 parts by volume per 1 part by volume of the crude 2-mercaptobenzothiazole.

10. The process of claim 8, wherein the aromatic hydrocarbon comprises octylbenzene, cresol, benzene, toluene or xylene.

11. The process of claim 8, wherein the alkaline solution is a solution of a caustic alkali.

12. The process of claim 11, wherein the concentration of the caustic alkali is from about 5 to 25% by weight.

13. The process of claim 10, wherein the aromatic hydrocarbon has a boiling point from 50° to 200°C under atmospheric pressure.

14. The process of claim 13, wherein the amount of the aromatic hydrocarbon used is 1 to 10 parts by volume per 1 part by volume of the crude 2-mercaptobenzothiazole.

15. A process for purification of the crude 2-mercaptobenzothiazole obtained by the reaction of aniline, carbon disulfide and sulfur at a high temperature under an elevated pressure which comprises dispersing the crude 2-mercaptobenzothiazole in a sufficient amount of an aromatic hydrocarbon, nitrobenzene or chlorobenzene to dissolve at least some of the components in said crude 2-mercaptobenzothiazole without dissolving said 2-mercaptobenzothiazole to thereby produce a dispersion or slurry having fine particles containing 2-mercaptobenzothiazole, filtering the resultant dispersion, discharging the collected particles into sufficient aqueous alkaline solution to dissolve the 2-mercaptobenzothiazole therein without dissolving the remaining components in said particles to thereby given an aqueous solution of the alkaline salt of 2-mercaptobenzothiazole, and filtering the resultant solution to remove insoluble impurities therefrom.

16. The process of claim 15, further comprising precipitating and collecting 2-mercaptobenzothiazole of high purity from the aqueous solution of the alkaline salt of 2-mercaptobenzothiazole.

17. The process of claim 1, wherein said crude 2-mercaptobenzothiazole contains at least one member selected from the group consisting of aniline, benzothiazole, phenyl isothiocyanate, 2-aminothiophenol, sulfur and tar, said at least one member being dissolved in the aromatic hydrocarbon, hydrobenzene or chlorobenzene as said crude 2-mercaptobenzothiazole is dispersed therein.

18. The process of claim 8, wherein said crude 2-mercaptobenzothiazole contains at least one member selected from the group consisting of aniline, benzothiazole, phenyl isothiocyanate, 2-aminothiophenol, sulfur and tar, said at least one member being dissolved in the aromatic hydrocarbon, hydrobenzene or chlorobenzene as said crude 2-mercaptobenzothiazole is dispersed therein.

* * * * *